Figure 1:
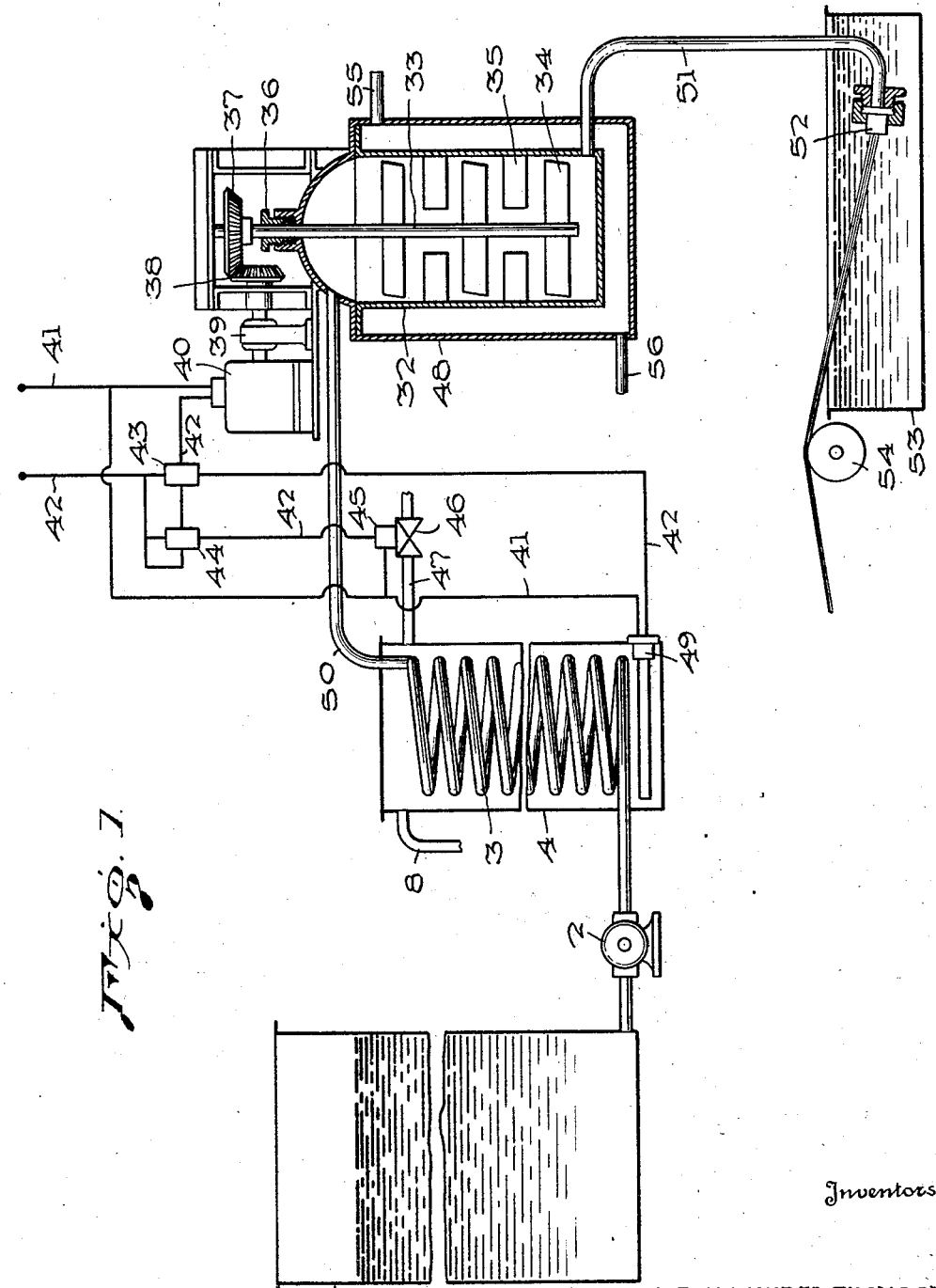

Feb. 3, 1948. R. H. K. THOMSON ET AL 2,435,416
APPARATUS FOR AGEING SOLUTIONS OF COLLOIDAL MATERIAL
Filed April 13, 1945 2 Sheets-Sheet 1

Inventors
ROBIN HAMILTON KENDAL THOMSON
WILLIAM SEVER
By Wager S. Brown
Attorney Inventors
ROBIN HAMILTON KENDAL THOMSON
WILLIAM SEVER Patented Feb. 3, 1948

2,435,416

UNITED STATES PATENT OFFICE 2,435,416

APPARATUS FOR AGEING SOLUTIONS OF COLLOIDAL MATERIAL

Robin H. K. Thomson, Kilwinning, and William Sever, Troon, Scotland, assignors to Imperial Chemical Industries Limited, a corporation of Great Britain Application April 13, 1945, Serial No. 588,204 In Great Britain April 28, 1944

4 Claims. (Cl. 18—8)

The present invention relates to an improved apparatus for ageing solutions of colloidal material.

It is frequently difficult to obtain a continued supply of a viscous aged solution of a desired constant viscosity from a batch of a solution made up from a colloidal material, especially when the latter is one obtained from a biological source, since the inherent viscosity characteristics of such colloidal materials are often liable to variation and since the conditions under which the material is made up into solution are frequently difficult to repeat with sufficient accuracy in the production of repetition batches, apart from the difficulty that may arise from the progressive change in the viscosity of the solution that occurs on storage. For many purposes, however, it is desirable that the aged solutions from repetition batches should be of the same viscosity and that no substantial fluctuation or progressive change should take place in the viscosity of the supply of the aged solution to be utilised over a considerable period of time. Thus, for instance, in the manufacture of articial filamentary products it is desirable that the viscosity of the solution to be extruded should remain at least at approximately the same value for several hours at a time. However, in the case, for instance, of viscose and other aqueous alkaline cellulosic solutions and in the case of protein solutions, such as are used for the production of wet spun artificial filaments, the chemical instability of the solution, the nature of the operations involved in forming the solution and the natural source of the material all militate against the maintenance of a steady viscosity during the spinning operation.

The object of the present invention is to provide apparatus to enable one or more batches of a solution of colloidal material susceptible to progressive change in viscosity on ageing to be varyingly aged so as to attain a constant viscosity as measured under suitable constant conditions and more especially to enable a stream of the aged solution to be continuously delivered at a pre-determined viscosity.

According to the present invention the method of ageing a stream of solution of the kind described to a predetermined viscosity for a fixed temperature comprises passing a stream of the solution at a regular rate of delivery through a heated zone heated by means viscostatically controlled by variations in viscosity from a fixed value in a continuously and progressively renewed fraction of the resulting aged solution brought to a fixed lower temperature.

Preferably the aged solution is brought to and delivered at a temperature at which any alteration in viscosity proceeds comparatively slowly.

It is to be understood that the heating means is viscostatically controlled when undesired variations in the viscosity of the aged and cooled solution adjust the extent to which a succeeding portion of the solution is aged in the heating zone, by control exerted on the temperature of ageing by means of an element responsive to changes in the viscosity of the aged solution at a lower and constant temperature which selectively applies heating or cooling to the exterior of the vessel forming the heating zone in which the accelerated ageing takes place, whereby the temperature of ageing, and hence the extent to which the solution is aged, is varied so that the viscosity of the aged and cooled solution settles to a constant value from which only small fluctuations on either side can take place, that is to say, the temperature of the said heating zone i. e. the zone in which the ageing takes place, is varied by means modulated in response to the variations in the viscosity of the cooled fraction as measured under constant conditions, the modulations being in such sense that changes in the viscosity of the cooled fraction result in changes of opposite sign in the viscosity of the rest of the stream after it has been cooled to the delivery temperature.

The process of the invention is applicable whether the solution of the colloid becomes more viscous or less viscous on ageing, and it can even be applied in many cases where the viscosity of the solution passes through a maximum or a minimum on ageing. Usually the effect of raised temperature is to accelerate the rate at which the viscosity rises or falls on ageing, while generally lowering the viscosity; but it may happen that the acceleration of ageing in the case of a solution whose viscosity rises on ageing masks the fall in viscosity when the solution is heated.

It is not essential that the constant temperature at which the aged solution passes to the point or points of delivery at which it is to be utilised should be the same as the constant temperature at which the aged solution is maintained in the zone wherein its viscosity variations actuate the aforesaid responsive means through which the viscostatic control of the accelerated ageing temperature is exercise. Moreover, it is not an essential feature of the invention that the zone in which the viscosity variations actuate the aforesaid responsive means should be in the course of the stream of aged solution passing from the accelerated ageing zone to the point or points of delivery of the aged solution in the condition in which it is to be utilised. The whole or part of the stream of aged solution passing from the accelerated ageing zone to the point or points of delivery may, however, pass through the zone wherein the viscosity variations of the cooled aged solution actuate the aforesaid responsive means. The aged solution that emerges at the point of delivery before the behaviour of the viscosity variation responsive means indicates that the viscosity has become steady may, if desired, be collected and mixed into the fresh solution in the reservoir that has not yet undergone accelerated ageing. Or, if the solution passing through the zone wherein its viscosity variations actuate the responsive means is continuously led into the stream of fresh solution that has not undergone accelerated ageing as yet instead of to the point or points of delivery, the communication between the zone of accelerated ageing and said point or points may be shut off until the behaviour of the means responsive to the variations in viscosity of the cooled aged solution indicate that the latter has attained a constant viscosity.

Broadly, the apparatus according to the present invention comprises a heat exchanger provided with heating means and a heated element having an inlet for the solution to be aged and an outlet for the aged solution, the outlet for said element providing access to apparatus-elements comprising means adapted to bring a stream of a continuously renewed fraction of the aged solution to a constant lower temperature and means whereby variations in the viscosity of the aged solution at that temperature viscostatically control the amount of heat supplied by the heating means to the heated element of the exchanger.

More particularly the aparatus will include a reservoir for the solution to be aged and a constant delivery pump leading therefrom to the heated element of the heat exchanger, and it will also include a conduit leading from the outlet of said heated element to one or more points of delivery, which will be jacketed at some portion of its length, and which may or may not lead through the aforesaid apparatus wherein the viscosity variations exercise the viscostatic control.

In one form of apparatus the viscostatic control is exercised by causing the variations from a predetermined amount in the amount of energy required to maintain a rotor in motion at constant speed with respect to the stream of the liquid at the constant temperature are caused to operate a relay controlling the heat input in the heat exchanger, advantageously by selectively actuating devices for raising and lowering the temperature prevailing in the heating element of the heat exchanger.

In quite another form of apparatus the viscostatic control is exercised by causing the variations from a fixed value of the pressure differential of the cooled aged solution flowing at constant rate through a constricted channel to actuate pistons controlling means for regulating the heat input into the heat exchanger. According to this form of the invention the apparatus preferably comprises a plurality of pistons balanced against one another so as to neutralise the effect of changes in the barometric pressure or other factors independent of the properties of the solution flowing through the constricted channel that might cause the pistons to move.

Figure 2:
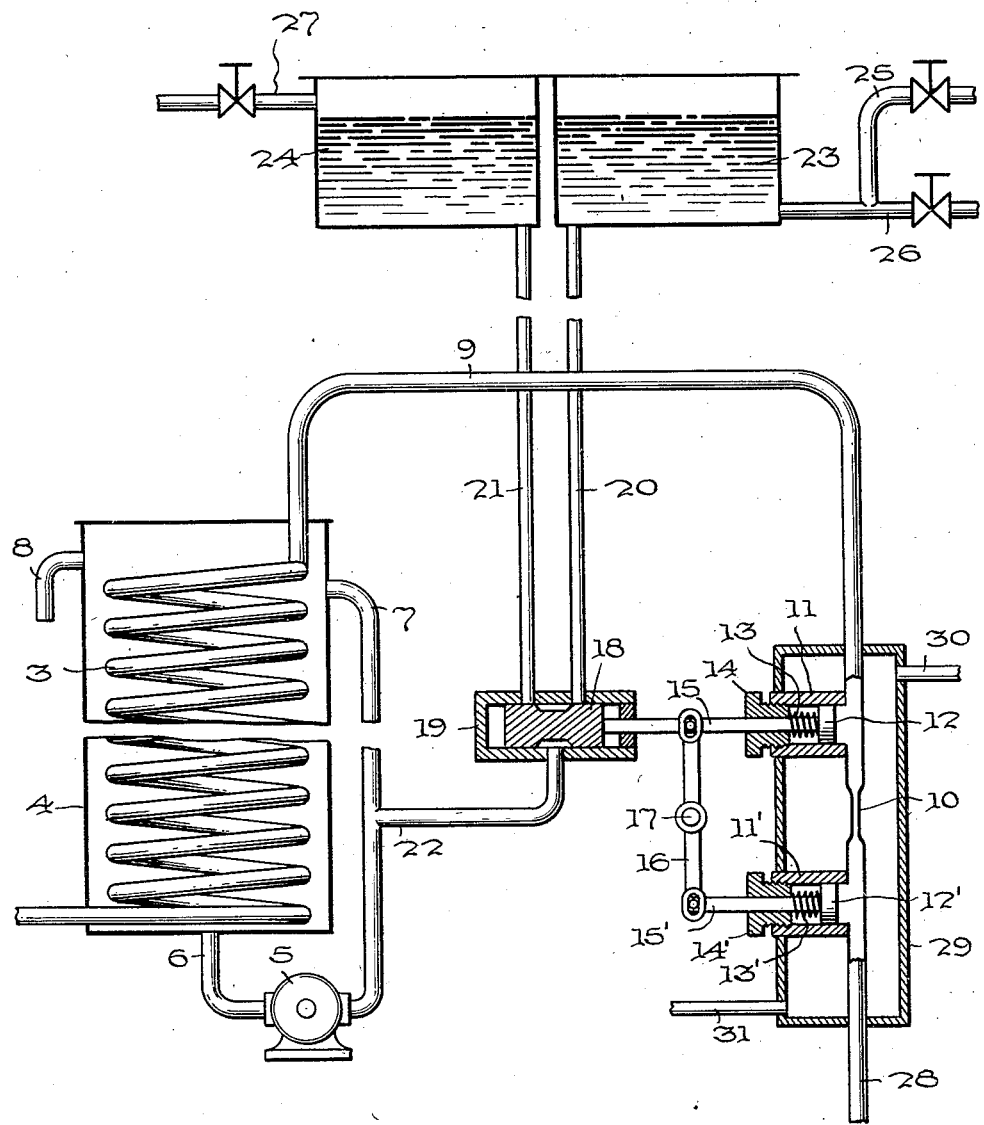

The invention will be further understood by reference to the diagrammatic drawings accompanying the specification, whereof Figure 1 represents in vertical section an apparatus for carrying out the invention in one form and Figure 2 represents mainly in section a portion of an apparatus for carrying out the invention in another form.

In Figure 1, 1 represents a reservoir for the freshly made solution of, say, viscose or peanut globulin in aqueous alkali, 2 a constant delivery pump, 3 a spiral pipe of smaller capacity than the reservoir 1, 4 a jacket and 47 and 8 respectively the inlet and overflow therefrom. 32 is a vessel of smaller capacity than the pipe 3, fitted with vanes 35, a jacket 48, a stirrer 34 and an outlet 51. The outlet pipe 50 from the spiral pipe 3 leads into the vessel 32. 33 is the spindle of the stirrer and 36 is a gland. 37 is a bevel wheel and 38 is a bevel pinion. 39 is a gear box and 40 is a constant speed shunt wound electric motor. 41 is an earthed conductor and 42 is a conductor leading from a live terminal. 43 is a self-returning overload trip relay which when actuated switches on the electric immersion heater 49. 44 is a self-returning underload trip relay, 45 is a solenoid and 46 is a self-returning cold water inlet valve the opening of which is controlled by the solenoid 45. 55 is an inlet for water at a lower temperature than the solution in the pipe. 50 and 56 are outlets for the cooling water. 52 is a spinneret, 53 is a spinning bath and 54 is a godet.

The water flowing through the inlet 47 is at a higher temperature than atmospheric and is hot enough to effect a substantial acceleration of the ageing of the solution.

In Figure 2 the parts 3, 4 and 8 have the same significance as in Figure 1. 5 is a circulating pump, 6 is a water inlet into the jacket 4 and 7 is a return pipe from the jacket 4. 9 is the outlet pipe for the aged solution and 10 is a constricted portion of this pipe, which is continued as delivery pipe 28 beyond the constricted portion. 11 and 11' are cylinders, 12 and 12' are pistons and 13 and 13' are springs in compression adjustable by the threaded nuts 14 and 14'. 15 and 15' are piston rods, 16 is a crosspiece swivelling about a spindle 17. 18 is a piston working in a cylinder 19 and ported to establish a communication between a pipe 22 leading to the return pipe 7 and either a hot water feeding pipe 20 or a cold water feeding pipe 21 according as the pressure drop between the solution pressing on the piston 12 and that pressing on the piston 12' increases or decreases. 24 is a cold water tank and 27 is a cold water supply pipe. 23 is a hot water tank and 25 and 26 are cold and hot water supply pipes. 29 is a water jacket, and 30 and 31 are inlet and outlet tubes of the water jacket.

We claim:

1. Apparatus for wet spinning a solution of organic colloidal material which is susceptible to progressive change in viscosity on ageing which comprises in combination a heat exchange unit with a heated element for continuingly heating a stream of the colloidal solution, a heat exchange unit for continuingly cooling a stream of the colloidal solution subsequently to heating in said first heat exchange unit to a substantially constant controlled lower temperature, means for controlling the amount of heat supplied to said heated element in accordance with variations in the viscosity of said cooled solution stream, a spinneret and a conduit leading from the first heat exchange unit through said cooling unit and said heat supply control means to said spinneret.

2. The apparatus of claim 1 wherein there is included a reservoir for said colloidal solution and a constant delivery pump leading from said reservoir to said first heat exchange unit.

3. The apparatus of claim 1 wherein the viscostatic control means comprises a rotor adapted to rotate at constant speed in said cooled solution, so that the variations from a predetermined amount in the amount of energy required to maintain the rotor in motion at constant speed are caused to operate a relay controlling the heat input into the heat exchanger.

4. The apparatus of claim 1 wherein the viscostatic control means comprises a constricted channel in which the variations from a fixed value of the pressure differential of the cooled solution flowing at a constant rate through the said constricted channel are caused to actuate piston controlling means for regulating the heat input into the heat exchanger, and said piston controlling means operates on a plurality of pistons which are balanced against one another so as to neutralise the effect of changes in factors independent of the properties of the solution flowing through the constricted channel, which factors might cause the pistons to move.

ROBIN H. K. THOMSON.
WILLIAM SEVER.

REFERENCES CITED

The following references are of record in the file of this patent:

UNITED STATES PATENTS

| Number | Name | Date |
| --- | --- | --- |
| 1,534,091 | Smoot | Apr. 21, 1925 |
| 1,918,270 | Kegl et al. | July 18, 1933 |
| 1,984,285 | Richter | Dec. 11, 1934 |
| 2,023,106 | Staege | Dec. 3, 1935 |
| 2,042,860 | Peabody et al. | June 2, 1936 |
| 2,192,039 | Harcourt | Feb. 27, 1940 |
| 2,242,419 | Cowles | May 20, 1941 |
| 2,267,317 | Veenschoten | Dec. 23, 1941 |
| 2,325,573 | Thompson et al. | July 27, 1943 |
| 2,392,269 | Schmitz | Jan. 1, 1946 |